United States Patent [19]

Davenport, deceased et al.

[11] 4,418,992

[45] Dec. 6, 1983

[54] OPHTHALMIC PROGRESSIVE POWER LENS AND METHOD OF MAKING SAME

[75] Inventors: Lawrence J. Davenport, deceased, late of Los Angeles, Calif.; Nancy Davenport, executrix, Downey, Calif.

[73] Assignee: Younger Manufacturing Company, Los Angeles, Calif.

[21] Appl. No.: 378,528

[22] Filed: May 17, 1982

[51] Int. Cl.³ .............................................. G02C 7/06
[52] U.S. Cl. .................................... 351/169; 351/177
[58] Field of Search ................................ 351/168–172, 351/177

[56] References Cited

U.S. PATENT DOCUMENTS 4,274,717  6/1981  Davenport ........................ 351/169

Primary Examiner—John K. Corbin
Assistant Examiner—Scott J. Sugarman
Attorney, Agent, or Firm—James E. Brunton

[57] ABSTRACT

An improved ophthalmic lens and method of making same, said lens being formed of refractive material having two refractive surfaces one of which is divided into first and second viewing zones intended respectively for distant vision and near vision. The first viewing zone of the lens occupies substantially the upper half of said one surface and may be spherical or it may be an aspheric surface of revolution. The second zone of the lens occupies the lower portion of said one surface and is uniquely configured to markedly reduce blur and distortion. The method of the invention provides a novel and superior technique for smoothly connecting the surface between the distance and near viewing portions of the lens. The lens produced by the method is unique in that blur and distortion in the portion of the lens predominently used by the wearer is substantially eliminated.

7 Claims, 5 Drawing Figures

OPHTHALMIC PROGRESSIVE POWER LENS AND METHOD OF MAKING SAME

BACKGROUND OF THE INVENTION

1. Field of the Invention

The present invention relates generally to ophthalmic lenses. More particularly the invention relates to ophthalmic lenses having progressively varying focal power.

2. Discussion of the Prior Art

The human eye is a wonderful and sensitive organ. It has a lens which is on the outer surface of the eye to receive light from objects in the field of view of the eye. It also has a retina which is positioned in back of the lens to serve as a viewing screen for objects properly focused by the eye lens. When the normal eye views relatively distant objects, the lens is in the relaxed position, and in this position, has the proper curvature on its surface to focus the object on the retina.

Upon the observance of objects at close range, however, eye muscles surrounding the lens act upon the lens to increase its curvature and decrease the focal length of the lens just sufficient to focus the image of the near object on the retina. This ability of the eye to adjust itself for varying object distances is known as "accommodation". As the age of a human being increases, his power of accommodation decreases. This results from the fact that his eye muscles become stiff and weak. For example, a child can normally change the focal powers of his eye by more than 14 Diopters. In middle age, the power of accommodation is reduced to about 3 Diopters, and in old age, the power of accommodation may disappear entirely.

Multifocal lenses such as bifocal and trifocal lenses have been devised to aid the vision of persons who suffer from reduced powers of accommodation. The bifocal lens, for example, is in effect formed from two separate segments of different dioptic powers. The power of one segment is such that vision through it permits focusing on near objects such as reading matter. The other segment corrects the vision for viewing distant objects.

Trifocal lenses are in effect formed from three separate segments of different dioptic powers. These lenses are similar to the bifocal lens, but also include an intermediate viewing segment.

A serious drawback of prior art multifocal lenses resides in the fact that there are optically sharp differences between the viewing portions. This gives rise to confusion when the line of sight scans the optical demarcation lines dividing the segments. This confusion is not only annoying to the user, but also can be quite dangerous causing on occasion serious injury due to falls down stairs and the like.

Several attempts have been made in the past to eliminate lines of optical demarcation in bifocal or trifocal lenses. One solution to this problem is to provide an intermediate region between the near and far vision segments having properties that vary gradually with distance over the surface so as to provide a grandual transition between the near and distance portions of the lens. Such lenses are frequently referred to as "progressive" lenses.

A progressive lens of typical prior art design comprises two refractive surfaces on opposite sides of a block of refringent material. The first (inner) of the two refractive surfaces is usually a spherical or toric surface and the second (outer-convex) is the co-called progressive surface.

This progressive surface is typically designed and manufactured to present an upper single focus spherical surface portion providing a far vision zone or lens portion. This portion has a first focal power and the optical center thereof is the optical center of the whole progressive lens.

Also presented is a lower single focus spherical surface portion which provides the near or reading vision zone or lens portion. This portion has a second higher focal power and is located around a point called the near vision center.

Finally there is presented an intermediate progressive surface portion of which the meridian curve extending from the optical center of the lens to the near vision center is called the meridian of progression. The spherical power of the lens varies along this meridian of progression from its value at the optical center of the lens to its value at the top of the near vision center according to a predetermined law.

The following patents are illustrative of prior art co-called progressive lenses and represent the most pertinent prior art known to applicant:

U.S. Pat. No. 2,869,422—Cretin-Maitenaz
U.S. Pat. No. 2,878,721—Kanolt
U.S. Pat. No. 3,785,724—Cretin-Maitenaz
U.S. Pat. No. 4,055,378—Winthrop
U.S. Pat. No. 4,056,311—Winthrop Additionally, articles by A. G. Bennette in the October and November, 1970 and the February and March, 1971 issues of "The Optician" discuss various attempts to provide progressive lenses.

One of the most successful prior art lenses ever devised is that illustrated and described in U.S. Pat. No. 4,274,717 issued to the present inventor. The present invention is distinguishable from that described in this aforementioned patent because of the unique manner of definition and generation of the progressively powered lens surface of the present invention.

SUMMARY OF THE INVENTION

It is an object of the present invention to provide a new and unique method of making a progressive power ophthalmic lens having an upper portion adapted for distance viewing and a lower portion adapted for close viewing. The upper portion may be spherical, or it may be an aspheric surface of revolution. The lower portion can be described by an envelope of a set of spheres.

It is another object of the invention to provide an improved method of making a progressive power lens of the aforementioned character in which the progressively powered surface interconnecting the upper and lower portions of the lens is uniquely configured to markedly reduce blur and distortion.

It is a further object of the invention to provide an improved method of making a progressive power lens of the character described in the preceeding paragraph in which there is defined a superior technique for smoothly connecting the surface between the distance viewing and near viewing portions of the lens.

It is another object of the invention to provide a new multifocal lens in which the line of demarcation between the far distance and the near distance viewing portions is rendered invisible.

Still another object is to provide a progressive lens of the above character which can be relatively easily and inexpensively formed on a reproducible basis and is capable of large quantity manufacture.

A still further object is to provide a method of forming a progressive lens having a uniquely defined curve which connects the circular arcs formed when one of the planes parallel to the y-z plane of the lens intersects the surface of the lower part of the lens.

DESCRIPTION OF ONE EMBODIMENT OF THE INVENTION

Figure 1:
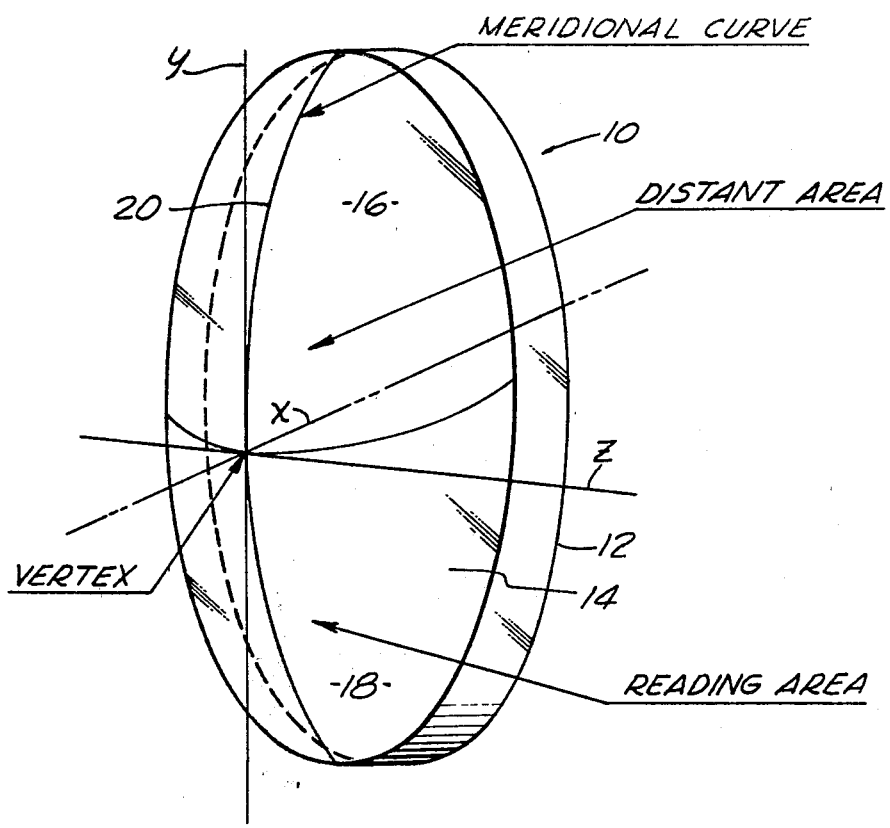
FIG. 1 is an isometric view of one form of the progressive power ophthalmic lens of the invention illustrating the configuration and location of the meridional curve, the distant vision area and near vision, or reading area. The locations of the x, y and z axis of the lens is also indicated in this Figure.

Referring to the drawings, and particularly to FIG. 1, there is shown one form of a progressive power ophthalmic lens 10 of the present invention. The lens 10 comprises two refractive surfaces formed on opposite sides of a block of refrigent material, the back refractive surface 12 being a single surface and front refractive surface 14 being a so-called progressive surface. The simple surface and the progressive surface determine therebetween an upper lens portion 16 for far vision and a lower lens portion 18 for near vision.

The lens 10 may be constructed of an optical material having a uniform refractive index such as optical quality glass or it may be constructed of one of the well-known optical quality plastic materials such as CR-39 (allyl diglycol carbonate), Lexan (polycarbonate) or methyl methacrylate.

The meridional curve of the lens is generally designated in FIG. 1 by the numeral 20. The term "meridional curve" relates to the curve formed by the lens along a line 20 in FIG. which in effect divides the lens into equal halves. Each position on one half has a corresponding position with similar properties of curvature and focal power in the other half.

Figure 5:
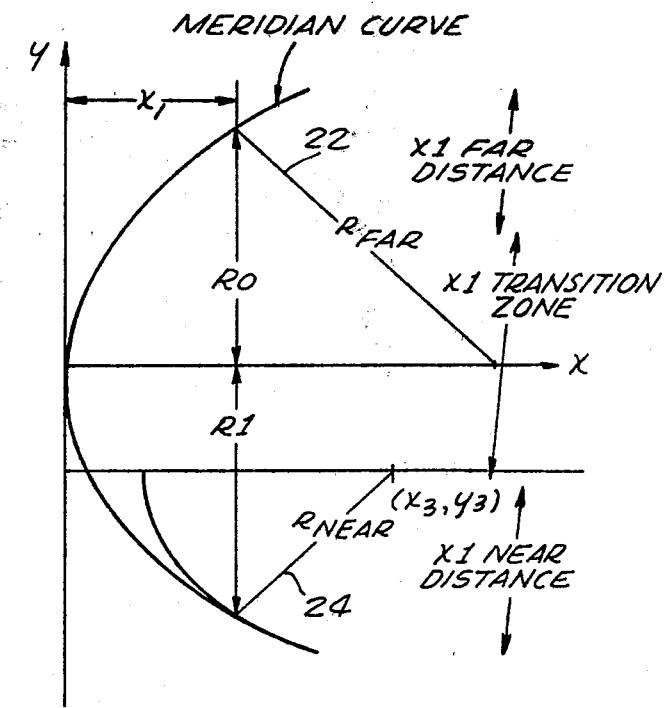
FIG. 5 is an explanatory diagram illustrating the manner of derivation of the curvature of the meridional curve in the x, y plane of the lens.

Meridional curve 20 is a smooth curve at every position and has no discontinuities and breaks. Although it is smooth, the meridional curve may have a different radius of curvature at every position. Radii of curvature at different positions along the meridional curve 20 are illustrated at 22 and 24 in FIG. 5

Figure 2:
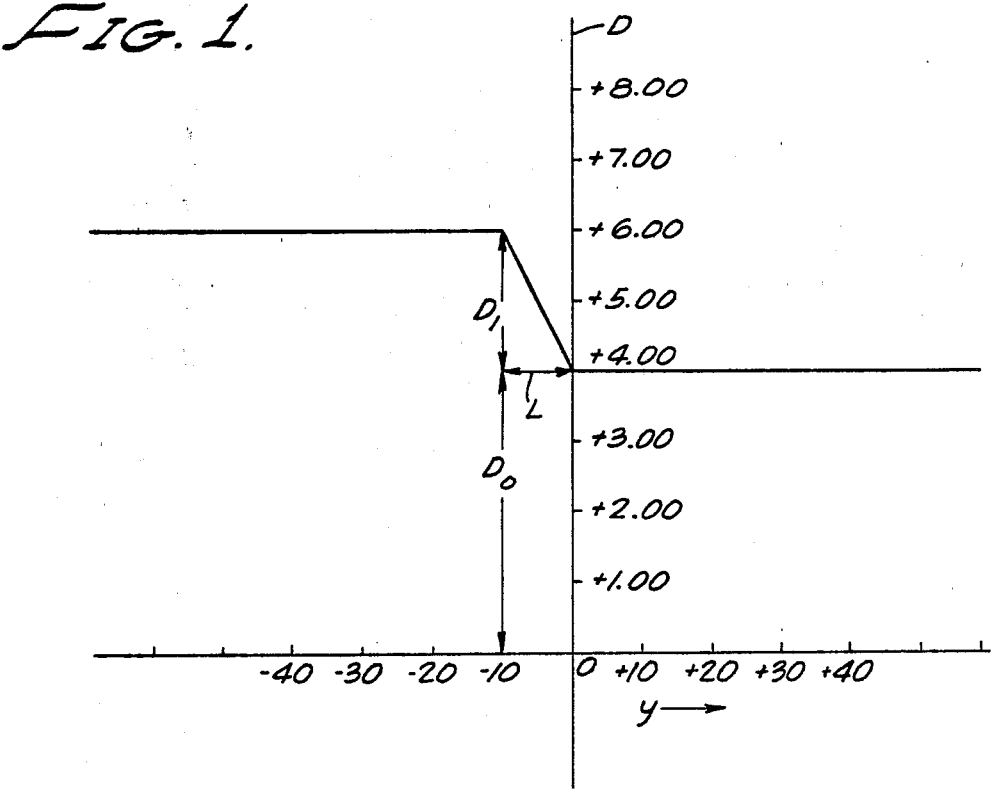
FIG. 2 is an explanatory diagram illustrating for one type of the lens the power distribution along the meridional curve.
Figure 4:
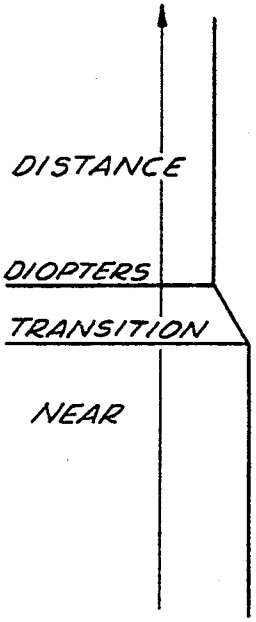
FIG. 4 is a further explanatory diagram illustrating for another type of lens the power distribution along the meridian plane.

In the practice of the method of the present invention the contour of the meridional curve is first calculated. Referring to FIGS. 2 and 4, this can be done in accordance with any one of several methods including, by way of example, one of the following four methods:

1. Constant power in the distance portion and linear power add from the vertex (0,0,0) to the bottom of the lens:

(1a) $Y \geq O, D = D_o$ (base curve)

(1b) $Y < O, D = D_o + \dfrac{D_1}{L} Y$

Where D1 is the power add and $-L$ is the distance from the vertex to the reading area 2. Constant power in both the distance and near portions with a linear power change between them:

(2a) $Y \geq O, D = D_o$      base curve (2b) $L \leq Y o, D = D_o + \dfrac{D_1}{L} Y$    transition (2c) $Y < L, D = D_o + D_1$      near 3. Constant power in the distance portion and a parabolic power transition through the intermediate and near portions:

(3a) $Y \geq O, D = D_o$ (3b) $Y < O, D = D_o + D_1 - \dfrac{D_1}{L^3} (L - Y)^2$ 4. Constant power in the distance and near portions with a parabolic power transition through the intermediate portion:

(4a) $Y \geq O, D = D_o$      base curve (4b) $O > Y > L, D = D_o + D_1 - \dfrac{D_1}{L^2} (L - Y)^2$    transition (4c) $Y \leq L, D = D_o + D_1$      near It is to be understood that the meridional curve as determined in accordance with the present invention is smooth, having no discontinuities. The curvature R of the meridional curve is expressed in terms of the following coordinate system:

$$\frac{1}{R} = \frac{d^2x}{dy^2} \left[ 1 + \left( \frac{dx}{dy} \right)^2 \right]^{-3/2}$$

As previously discussed herein, the thrust of the present invention resides in the novel manner in which the surface of the lens in the intermediate zone is generated.

Following the determination of the contour of the given smooth meridional curve, the area to one side of the meridional curve of the lens is divided by two planes disposed perpendicularly to the y−z plane of the lens (see FIG. 1) and containing the x axis of the lens. The angles of these planes are defined and fixed for an individual design. Once fixed, these angles define the three previously described lens portions or zones, namely the zones intended for distant vision, intermediate vision and near vision.

Figure 3:
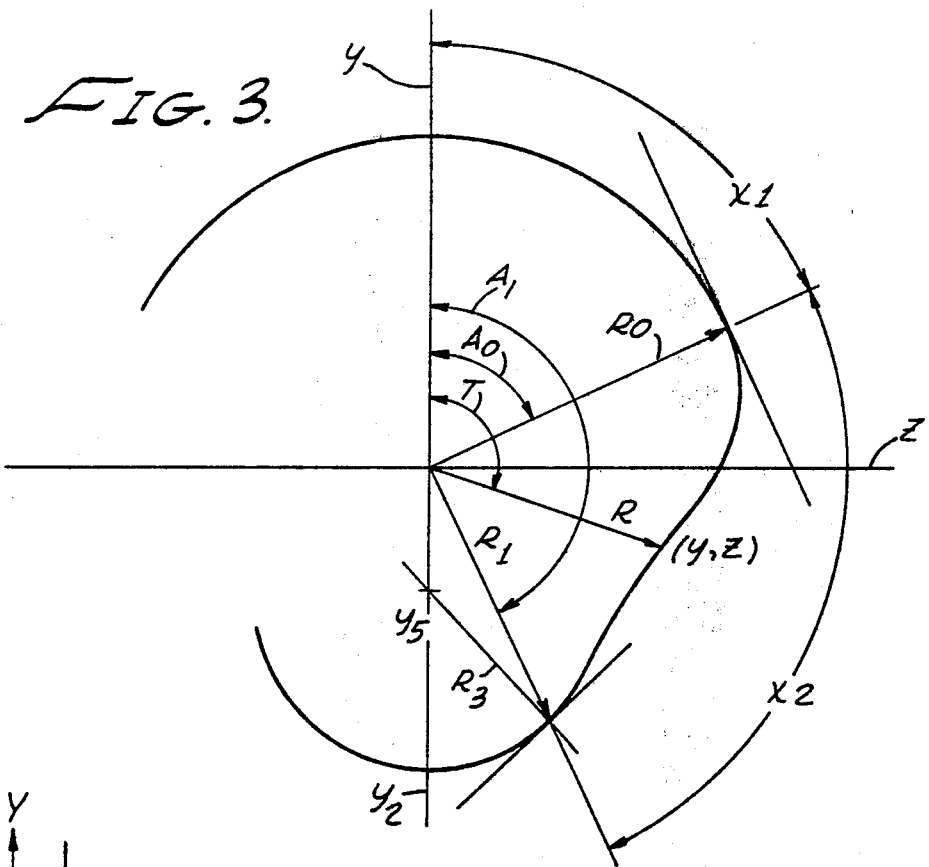
FIG. 3 is an explanatory diagram taken in the x, y plane illustrating the manner of derivation of the contour of the spiral curve of the lens in one plane cross-section located at any fixed depth (x) perpendicular to the "axis" axis of the lens.

The angles of the aforementioned two planes are measured from the positive direction of the y axis, clockwise (positive) angles from 0 to $2\pi$ radians. The lens of the invention is symetrical to the y axis so that only angles from 0 through $\pi$ are required. Referring to FIG. 3, the angle T is the angle variable with values of 0 to AO for the distance portion; AO to A1 for intermediate portion; and A1 to $\pi$ for the near portion. The radius vector from the origin (x,o,o) and the angle T define the contour in the plane x, where x is the sag of the curve and is constant for each contour. The radius is a function of the angle T. By transfering the angle T to an angle U, thusly:

$$U = T - (A_o + A_1)/2$$

we transform the reference to the angle from the bisector of $A_o$ and $A_1$. The radius can then be expressed as the power series:

$$F = G_0 + G_1 U + G_2 U^2 + G_3 U^3 + G_4 U^4$$

and the first and second derivatives with respect to T and also to U are:

$$dR/dT = dR/du = G_1 + 2G_2 U + 3G_3 U^2 + 4G_4 U^3$$

and $$d^2R/dT^2 = d^2R/du^2 = 2G_2 + 6G_3 U + 12G_4 U^2$$

The boundary conditions to be met are as follows:
At $T = A_o$, with the radius of the distant viewing curve being RO:

$$RO = G_0 + G_1 U + G_2 U^2 + G_3 U^3 + G_4 U^4 \quad (B1)$$

At $T = A1$, with the radius of the near viewing circle being R1:

$$Rl = G_0 + G_1 U + G_2 U^2 + G_3 U^3 + G_4 U^4 \quad (B2)$$

At T=AO, the radius change with angle=0: (Arcs tangent at (Ao)

$$dR/dU = 0 = G_1 + 2G_2 U + 3G_3 O^2 + 4G_4 U^3 \quad (B3)$$

At T=A1, the radius change with angle is finite: (Arcs tangent at A1)

$$dR/dU \equiv Dl = G_1 + 2G_2 U + 3G_3 O^2 + 4G_4 U^3 \quad (B4)$$

At R=A1, the second derivative $dR^2/dU^2$ is finite: (Arcs curvature of A1)

$$d^2R/dU^2 \equiv D2 = 2G_2 + 6G_3 U + 12G_4 O^2 \quad (B5)$$

By suitable algebraic manipulation the five coefficients $G_o$ through $G_4$ can be solved in the order shown to be as follows:

$$G_3 = \frac{1}{4U^2}\left(Dl - \frac{RO - R1}{U}\right)$$

$$G_1 = \frac{Dl}{2} - 3(G_3) U^2$$

$$G_4 = \frac{Dl}{4U^3} + \frac{D2}{8U^2} - \frac{3(Ro - R1)}{16U^4}$$

$$G_2 = \frac{-D9}{4} - \frac{3Dl}{4U} + \frac{3(RO - R1)}{8U^2}$$

$$G_0 = RO - F1 U - G2 U^2 = G3 U^3 - G4 U^4$$

Since Ro and R1 are calculated from the dioptic powers far and near respectively, they are known values. However, it is not obvious that D1 and D2 are also known by the geometry of the placement of the near region from the orgins (x,o,o). Accordingly let:

ys=radius position of the center of the near circular arc from (x,o,o) in the y,z plane;

and let

R3=circular radius of the near circular arc in the y−z plane.

Through further algebraic manipulations it can be shown that:

$$D1 = -Y5 \sin T - \frac{(\sin T \cos T)(Y5)^2}{(R_3{}^2 - (\sin T)^2 (Y5)^2)^{\frac{1}{2}}}$$

and $$D2 = -Y5 \cos T - \frac{(Y5)^2 (1 - 2\sin^2 T)}{((R3)^2 - (\sin T)^2 (Y5)^2)^{\frac{1}{2}}}$$

$$- \frac{(Y5)^4 (\sin T)^2 (\cos T)^2}{((R3)^2 - (\sin T)^2 (Y5)^2)^{3/2}}$$

Where the following formula defines the near circular section:

$$(Y - YS)^2 + Z^2 = (R3)^2$$

As a result of the foregoing assumptions the entire lens surface is naturally divided into the previously identified viewing zones with the right meridion side being presently defined the first, or far distant viewing zone is disposed between the angles T=0 and T=AO; the second or transition zone lies between the angles T=AO and T=A1; the third near viewing or reading "add on" zone lies between the angles T=A and T=$\pi$. The left meridian side being the mirror image of the right side reflected by the y−z plane completes the specification of the novel and unique shape of the progressive lens surface. To complete the lens, the opposite surface thereof is, of course, ground and polished to a spherical or toroidal shape to meet the specific prescription requirements.

I claim:

1. A method of making an improved ophthalmic lens having an x, y and z axis with progressive varying focal length characterized by having two refractive surfaces, one of which is divided into first, second, and third viewing zones intended respectively for distant vision, intermediate vision and near vision said one surface including a meridional curve passing through the optical center of the lens and traversing said zones, said meridional curve being defined by a sequence of points on said one surface, said first and third zones being either spherical, or being aspheric surfaces of revolution, the improvement consisting of a method of generating said second viewing zone which is the progressively powered surface interconnecting said first and third zones, said method comprising the steps of:

(a) defining the desired contour of the meridional curve;

(b) dividing the area on a first side of said meridional curve by two planes disposed perpendicularly to the y−z plane of the lens and containing the x axis thereof; and (c) defining the progressive lens surface by a method including the steps of:
(1) defining the angle U as $$U = (T - A_o + A_1)/2$$

where T is the angle variable with the values of 0 to $A_o$ for the distance portion of the lens; $A_o$ to $A_1$ for the intermediate portion of the lens; and $A_1$ to for the near portion of the lens;

it is to be noted that the radius vector from the origin (x,o,o) and the angle T define the contour in the plane x, where x is the sag of the curve and is constant for each contour, the radius being a function of the angle T;

(2) expressing the radius R as a power series as follows:

$$R = G_o + G_1 U + G_2 U^2 + G_3 U^3 + G_4 U^4$$

and expressing the first and second derivatives with respect to T and also U thusly:

$$dR/dT + dR/du = G_1 + 2G_2 U + 3G_3 U^2 + 4G_4 U^3$$

and $$d^2R/dT^2 = d^2R/du^2 = 2G_2 + 6G_3 U + 12G_4 U^2;$$

(3) establishing boundary conditions as follows:
(a) At $T = A_o$, with the radius of the distant viewing curve being RO:

$$RO = G_o + G_1 U + G_2 U^2 + G_3 U^3 + G_4 U^4;$$

(b) At $T = A_1$, with the radius of the near viewing circle being R1:

$$R1 = G_o + G_1 U + G_2 U^2 + G_3 U^3 + G_4 U^4;$$

(c) At $T = AO$, the radius change with angle = 0: (arcs tangent at Ao)

$$dR/dU = 0 = G_1 + 2G_2 U + 3G_3 O^2 + 4G_4 U^3;$$

(d) At $T = A_1$, the radius change with angle in finite: (arcs tangent at A1)

$$dR/dU \equiv D1 = G_1 + 2G_2 U + 3G_3 O^2 + 4G_4 U^3; \text{ and}$$

(e) At $R = A_1$ the second derivative $dR^2/dU^2$ is finite: (arcs curvature of A1)

$$d^2R/dU^2 \equiv D2 = 2G_2 + 6G_3 U + 12G_4 O^2;$$

(4) solving for $G_o$ through $G_4$ as follows:

$$G_3 = \frac{1}{4O^2}\left(D1 - \frac{RO - R1}{U}\right)$$

$$G_1 = \frac{D1}{2} - 3(G_3)U^2$$

$$G_4 = \frac{D1}{4U^3} + \frac{D2}{8U^2} - \frac{3(Ro - R1)}{16U^4}$$

$$G_2 = -\frac{D9}{4} - \frac{3D1}{4U} + \frac{3(RO - R1)}{8U^2}$$

$$G_o = RO - F1U - G2U^2 - G3U^3 - G4U^4; \text{ and}$$

(5) solving for D1 and D2 as follows:
(a) letting ys=radius position of the center of the near circular arc from (x,o,o) in the y,z plane;
(b) letting R3≡circular radius of the near circular arc in the y—z plane;

then $D1 = -Y5 \sin T - \frac{(\sin T \cos T)Y5)^2}{(R_3^2 - (\sin T)^2(Y5)^2)^{1/2}}$ ; and  (c)

$D2 = -Y5 \cos T - \frac{(Y5)^2(1 - 2\sin^2 T)}{((R3)^2 - (\sin T)^2(Y5)^2)^{1/2}} -$  (d)

$$\frac{(Y5)^4(\sin T)^2(\cos T)^2}{((R3)^2 - (\sin T)^2(Y5)^2)^{3/2}};$$

where the near circular section is defined as:

$$(Y - YS)^2 + Z^2 = (R3)^2.$$

2. The method of making an improved ophthalmic lens as defined in claim 1 in which the meridional curve is smooth having no discontinuities and the curvature R of the meridional curve is expressed as:

$$\frac{1}{R} = \frac{d^2y}{dy^2}\left[1 + \left(\frac{dx}{dy}\right)^2\right]^{-3/2}.$$

3. The method of making an improved ophthalmic lens as defined in claim 2 in which the lens exhibits constant power in both the distance and near viewing zones and the intermediate zone exhibits a linear power change between said distance and near viewing zones, and in which the contour of the meridional curve is defined as follows:

(a) $Y \geq O, D = D_o$ (base curve);

(b) $L \leq Y_o, D = D_o + \frac{D_1}{L} Y$ (intermediate viewing zone);

(c) $Y < L, D = D_o + D_1$ (near viewing zone).

4. The method of making an improved ophthalmic lens as defined in claim 2 in which the lens exhibits constant power in both the distance and near viewing zones and the intermediate zone exhibits a parabolic power change therethrough, and in which the contour of the meridional curve is defined as follows:

(a) $Y \geq O, D = D_o$ (base curve);

(b) $O > Y > L, D = D_o + D_1 - \frac{D_1}{L^2} L - Y^2$ (intermediate viewing zone); and (c) $Y \leq L, D = D_o + D_1$ (near viewing zone).

5. The method of making an improved ophthalmic lens as defined in claim 2 wherein the lens exhibits constant power in the distance viewing zone and a parabolic power transition through the intermediate and near distance viewing zones, and in which the contour of the meridional curve is defined as follows:

(a) $Y \geq O, D = D_o$ (base curve); and

-continued (b) $Y < 0, D = D_o + D_1 - \frac{D_1}{L^3}(L - Y)^2$.

6. The method of making an improved ophthalmic lens as defined in claim 2 wherein the lens exhibits constant power in the distance viewing zone and linear power add from the vertex of the lens to the bottom thereof, and in which the contour of the meridional curve is defined as follows:

(a) $Y \geq 0, D = D_o$ (base curve); and (b) $Y < 0, D = D_o + \frac{D_1}{L} Y$.

7. An improved ophthalmic lens manufactured in accordance with the method of claim 1.

* * * * *